United States Patent Office 3,606,245
Patented Sept. 20, 1971

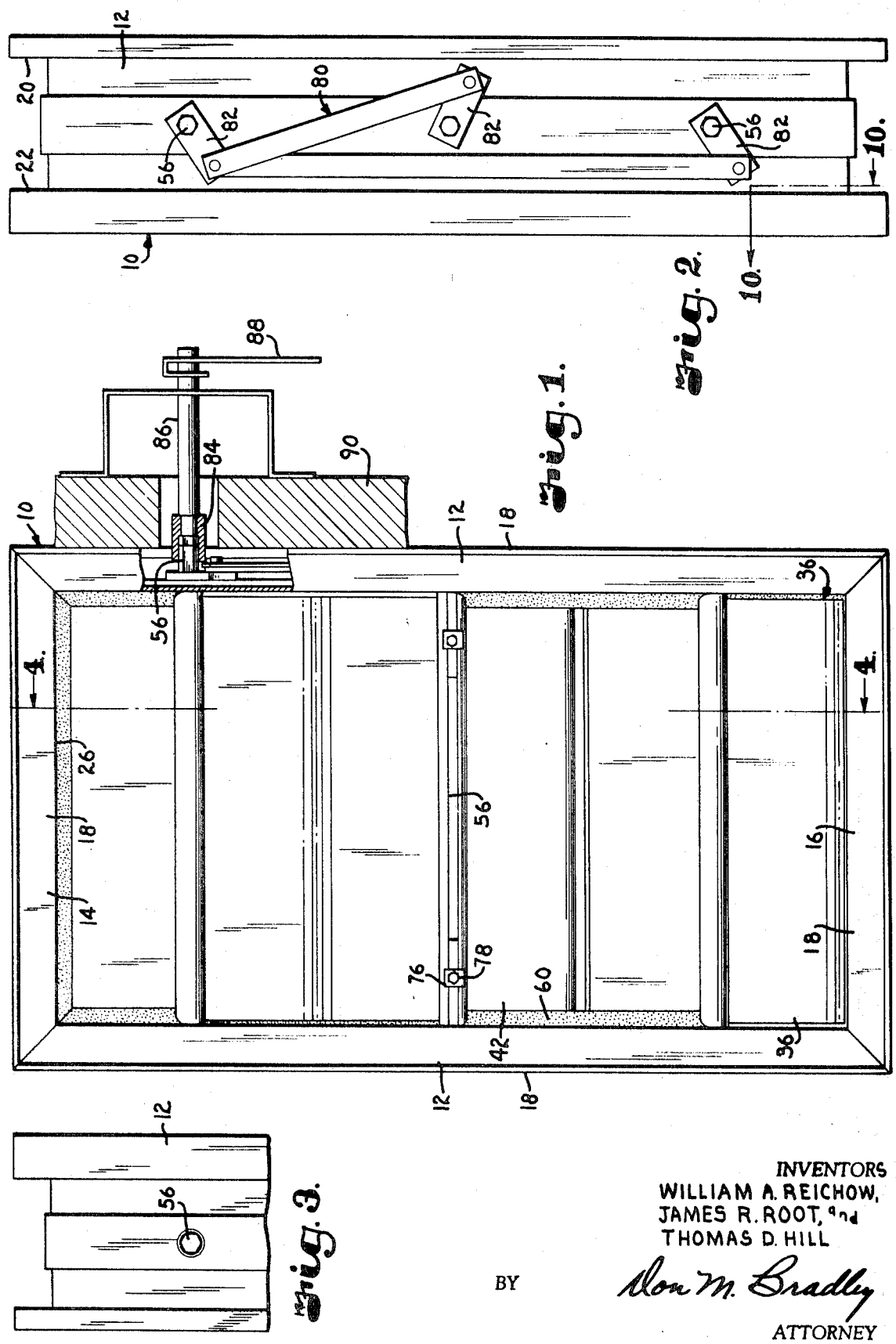

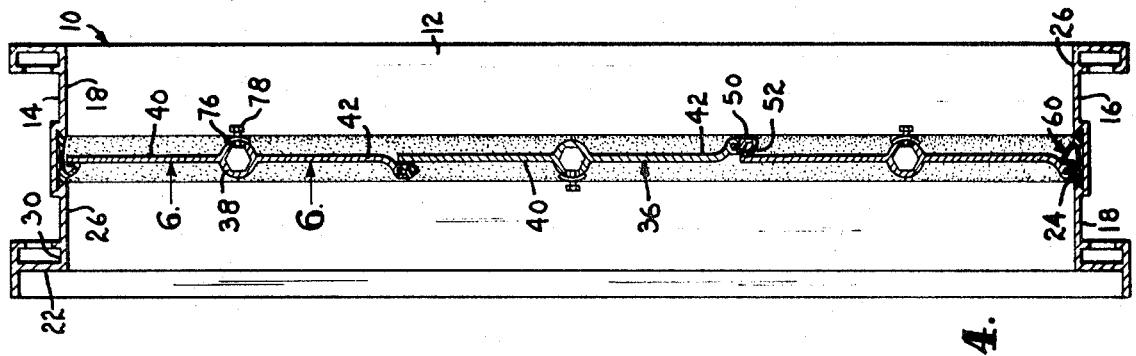

3,606,245
CONTROL DAMPER
William A. Reichow and Thomas D. Hill, Kansas City, and James R. Root, Independence, Mo., assignors to Ruskin Manufacturing Company, Grandview, Mo.
Filed June 30, 1969, Ser. No. 837,465
Int. Cl. F16k 1/226
U.S. Cl. 251—306
5 Claims

ABSTRACT OF THE DISCLOSURE

A damper having a rectangular frame provided with a longitudinal groove in each frame side member. A pivoted blade has tubular, cylindrical hubs extending into the grooves and a seal in each groove is configured to sealingly engage the arcuate outer surface of a corresponding hub throughout the movement of the blades to insure adequate sealing between the frame and blade when the latter is in its blocking position.

---

This invention relates to fluid control apparatus, and more particularly to a damper for controlling the flow of fluids such as air or the like through an aperture. Dampers of this general type are commonly used to control the amount of air admitted through a barrier. The dampers comprise an assembly of blades which are mounted for pivoting movement to regulate the size of an orifice defined by the damper frame. The blades of the assembly are often connected together by suitable linkage and a relatively low torque motor is operably coupled to the assembly for operating all of the blades simultaneously as a unit. The motor may be governed by a remote sensor such as a thermostat or the like.

The blades of a control damper of this general type often remain in a closed position for relatively long periods of time. When the blades are closed, it is important that leakage of air through the damper be kept to an absolute minimum. It is also important, however, that the blade assembly be easily movable from the closed position by the relatively low torque motor even after having remained for long periods of time in the closed position. It is also important that the damper be constructed in a manner to minimize any rattling or other objectionable noise as a result of differentials in fluid pressure on opposite sides of the damper.

Accordingly, it is the primary object of the present invention to provide a damper having enhanced blade to frame sealing characteristics when the blades are in the closed positions so that the leakage factor through the damper is reduced to an absolute minimum.

It is another important object of this invention to provide a damper utilizing a novel sealing arrangement at the region of blade pivoting to minimize or eliminate leakage at this critical locaton.

Still a further very important object of this invention is to provide a control damper constructed in a manner which minimizes the tendency of the blades to take on a permanent "set" after long periods with little or no movement, which "set" maximizes the torque needed to operate the damper and retards subsequent sealing against the flow of fluid through the damper.

Yet another object of the invention is to provide such a damper as hereinabove described which may be economically fabricated with a minimum requirement for specialized tools and labor.

These and other important objects of this invention will be further explained or will become apparent from the specification, claims and drawing.

In the drawing:

FIG. 1 is a front elevational view of a damper embodying the principles of this invention, parts being broken away and shown in cross-section to reveal details of construction; a typical installation being shown fragmentarily;

FIG. 2 is a side elevational view of the damper of FIG. 1;

FIG. 3 is a fragmentary side elevational view showing the side opposite that appearing in FIG. 2;

FIG. 4 is a cross-sectional view taken along line 4—4 of FIG. 1;

FIG. 5 is a view similar to FIG. 4, but showing the blades in their fully opened positions;

FIG. 6 is an enlarged, detailed cross-sectional view taken along line 6—6 of FIG. 4;

FIG. 7 is a fragmentary, vertical cross-sectional view through a blade shaft and illustrating a shaft fastener;

FIG. 8 is an enlarged cross-sectional view taken along line 8—8 of FIG. 5;

FIG. 9 is an enlarged, fragmentary end elevational view of a damper blade illustrating the configuration of the seal;

FIG. 10 is a fragmentary, front elevational view of the damper frame showing the means utilized for connecting the horizontal and vertical frame members, parts being broken away and appearing in cross-section for clarity;

FIG. 11 is an enlarged, end elevational view of a modified form of frame seal.

A control damper embodying the principles of this invention is broadly designated by the reference numeral 10 and comprises a rigid rectangular frame including a pair of parallel spaced-apart side members 12 interconnected at opposite ends with top and bottom frame members 14 and 16 respectively. The members 12–16 are preferably formed of aluminum or the like by an extrusion process. Accordingly, the cross-sectional configuration of the members 12–16 is identical and such configuration is best illustrated in FIGS. 4 and 5 of the drawing. Each member includes a web portion 18 interconnecting a pair of outwardly projecting channel members 20 and 22 disposed at the front and rear marginal edges of each member respectively. Web 18 is configured to present a longitudinal extending groove 24 communicating with the innermost surface 26 of each member.

Referring to FIG. 10 in conjunction with FIGS. 4 and 5, it may be seen that the channel members 20 and 22 are each provided with inwardly projecting lips 28 defining channels 30 in members 20 and 22. The frame members are rigidly interconnected to provide the rectangular frame by means of L-shaped rigid connectors 32 having respective legs received within the corresponding aligned channels 30 of interconnected frame members. Manifestly, the cross-sectional configuration of each connector 32 is such that the legs are complementally received within the respective channels 30. The lips 28 are swaged or beaded as at 34 (FIG. 10) to frictionally fasten the abutting ends of the members together. It is contemplated that a connector 32 will be provided at each corner and in each channel 30.

Each damper 10 includes one or more pivoting vanes 36. Manifestly, the number of vanes required for each damper depends ultimately upon the particular size of the opening defined by the peripheral frame. In the construction illustrated, damper 10 utilizes three vanes 36.

It is contemplated that each vane 36 be of identical construction and the vanes may be formed of aluminum or the like by a suitable extrusion process. Each vane comprises a central longitudinally extending tubular portion 38 having integral generally planar outwardly extending blade portions 40 and 42 as seen best in FIGS. 4 and 5. The outermost longitudinal edge of blade 42 is bent at an angle as illustrated in the drawings and is provided with a longitudinally extending generally arcuate groove 44 at the extreme outer edge of the blade. Referring to FIG. 9, it may be seen that the groove 44 is provided with a restricted neck opening for complementally receiving and gripping a projection 46 integral with a blade seal 48 made of rubber, plastic Neoprene or other suitable sealing material. Projection 46 provides the base for seal 48 from which projects a first leg 50 integral with the base and a second leg 52 integral with first leg 50 and projecting generally back toward the base at an acute angle with respect to leg 50. The outermost end of leg 52 is free as illustrated in FIG. 9.

Tubular vane portion 38 is provided with a longitudinally extending groove 54 extending the entire length of each blade. Transversely hexagonal stub shafts 56 are received within portion 38 of each blade and project outwardly from each end of each blade as illustrated best in FIG. 6. The transversely polygonal shafts 56 are received within suitable bearing 58 which may be constructed from Delrin or other suitable material. The bearings 58 are mounted in apertures extending through the webs 14 of the side members 12. A seal broadly designated 60 is received within each groove 24 in the respective frame members. As is illustrated best in FIG. 8, each seal 60 comprises a relatively heavy generally planar base portion 62 shaped for general complemental locking engagement in the dovetail configuration of the corresponding groove 24. A projection comprising a first generally planar leg 64 integral with base portion 62 and hingedly coupled with the latter extends outwardly from the base portion and is, in turn, integral with a second generally planar leg 66 projecting generally back toward base 62 at an acute angle with respect to leg 64. Here again, the outermost end of leg 66 is free.

Referring particularly to FIG. 6, it may be seen that the end edges 68 of each blade 40 and 42 terminate in inwardly spaced relationship from the outermost edge 70 of the tubular portion 38. Thus, each projecting end of portion 38 comprises a hub 72 for each end of each vane. The outer surface of each hub 72 is cylindrical and the proximal legs 64 and 66 of seal 60 are cut away to present an arcuate edge 74 which slidingly engages the cylindrical surface of the proximal hub 72 to seal against the passage of fluid between the hub and the corresponding frame member. To this end, it should be noted that each hub 72 extends into the corresponding groove 24 a sufficient distance to insure that a good sealing relationship is maintained between the vane and the seal at the junction between portion 38 and the seal.

Seal 60 is cut in lengths spanning the distances between the respective shafts 56 or between a shaft 56 and the proximal corner of the damper frame. The seal segments are installed with legs 64 and 66 facing in the appropriate direction whereupon the corresponding blades 40 and 42 engage against the leg 66 as the blades move into their closed positions whereupon the leg 64 is moved in a plane perpendicular to the plane of the base portion 62. Manifestly, the disposition of the seal segments is opposite on each side of each shaft 56 because the respective blades move in opposite directions on either side of the corresponding shafts 56.

The hexagonal shafts 56 may be of a size for easily telescoping within the tubular portions 38. The vanes are quickly and easily installed in the assembly by means of a tool such as a screw driver or the like which is inserted through groove 54 for pushing the shafts 56 outwardly to project through their corresponding bearings 58. Fasteners comprising an arcuate member 76 straddle groove 54 for drawing the edges of the grooves 54 together upon the tightening of a bolt 78 received through the corresponding member 76 and shaft 56. Manifestly, it is a simple matter to remove the vane from the assembly by simply loosening the fasteners and sliding the shafts longitudinally of the tubes to withdraw the shafts from the projecting end of each hub 72.

As illustrated in FIG. 4, the offset edge portion of each blade 42 is configured to result in the engagement of a projecting leg 52 of the corresponding seal 48 against the longitudinal edge portion of an adjacent blade 42. This construction insures an effective fluid seal between adjacent blades 40 and 42 when the blades are in their flow blocking positions. The vanes may be tailored to fit the particular frame opening dictated by the lengths of the frame side members 12 easily and economically by the cutting of the outermost edge of one or more of the blades 40 to accommodate the spacing between the shafts 56 of the respective vanes. It will be apparent that the straight configuration of each blade 40 permits removal of excess blade material without, in any manner, adversely affecting the sealing capabilities between adjacent blades 40 and 42.

The seals 48 for each blade 42 may be quickly and easily installed by sliding the same edgewise into the respective grooves 44. If desired, the grooves 44 may be of slightly different configuration from that of the projection 46 to cause sufficient deformation of the latter to effect a tight frictional lock of each seal 48 in its respective groove 44. Similarly, the grooves 24 in the frame members may also be configured to result in deformation of the seals 60 to frictionally lock the same in place in the grooves. Manifestly, it will be apparent that suitable adhesive material might also be provided for securing the seals in proper position.

Referring particularly to FIGS. 1 and 2, it may be seen that linkage 80 interconnects radially extending arms 82 which are rigidly secured to corresponding shafts 56 exteriorly of a side member 12. Thus, the vanes 36 are interconnected for simultaneous pivoting movement about their respective longitudinal axes upon the rotation of one of the shafts 56. To this end, a polygonal socket member 84 may be provided for telescoping over a projecting end of a shaft 56 as illustrated in FIG. 1. A rod 86 integral with member 84 may project laterally from damper 10 for attachment through a torque arm 88 to an actuating motor (not shown). In the installation appearing fragmentarily in FIG. 1, the rod 86 is adapted to project through a wall or barrier 90 in which damper 10 is installed.

The identical cross-sectional configuration of the damper frame members adapt them particularly for fabrication from elongated, extruded frame stock. The stock may be cut to whatever lengths are required to construct the damper in a size meeting the customer requirements. Further, the vanes may also be extruded in substantial lengths whereupon the respective vanes are cut from the stock material in lengths appropriate for the damper under construction. The respective blades of each vane may be quickly and easily sheared to present the projecting hubs 72 which cooperate with the arcuate seal edges proximal the region of blade pivotal movement to insure an effective seal in such region. Both the seals 48 and 60 may be cut from elongated stock material to whatever lengths are desired and such lengths may be quickly and easily installed by relatively unskilled workmen into the appropriate grooves 44 and 24 respectively. The particular configuration of the seals 48 and 60 having generally inverted transversely V-shaped projections with a free end leg member disposed to receive the proximal blade edge insures a resilient but effective seal when the vanes are moved to their closed positions. Any fluid pressure exerted against the seal member serves to force the leg member having a free end edge more tightly against its corresponding blade to establish a very effective seal against the passage of fluid through the damper when the vanes are in their closed positions.

The connectors 32 cooperate with the cross-sectional configuration of the frame members to permit effective yet rapid and economical fastening of the frame members in fabrication of the damper. Not to be overlooked is the fact that the transversely polygonal construction of shafts 56 minimize frictional engagement of the shafts in the bearings 58. Such transverse polygonal configuration of each shaft 56 also contributes to rigid connection of the shaft with its respective tubular vane portion 38.

Since a highly yieldable sealing engagement is effected between respective blades and between the blade edges and the frame members, there is little tendency for the components of the damper assembly to take a permanent "set" after long periods between articulation of the vanes. The seals prevent metal to metal contact when the vanes are in their closed positions, thereby eliminating any tendency for metals to fuse together to resist or prevent subsequent articulation of the vanes.

FIG. 11 illustrates a modified form of seal 160 which may be used, instead of seal 60, in the longitudinal grooves 24 of the frame members. The spaced apart, longitudinally extending generally planar, flexible fingers 164 are hingedly coupled with and project outwardly from base portion 162 as shown in FIG. 11. When seal 160 is utilized in damper 10, these fingers 164 readily flex, as they are engaged by the blades, in a plane perpendicular to the plane of the base portion 162 to permit easy swinging of the damper blades. The resilient material from which the seal is constructed holds enough of the fingers against the blades, however, when the blades are closed, to effect a highly reliable sealing action against passage of fluid. The free end construction for the fingers permits the fluid pressure to assist in the sealing between the seal fingers and the blades.

Having thus described the invention, what is claimed as new and desired to be secured by Letters Patent is:

1. A damper comprising:
   a rigid, rectangular frame including a pair of spaced apart side members, each member having a longitudinally extending channel communicating with the inner surface thereof;
   a vane for said damper, said vane including a generally flat blade and a pair of tubular hubs projecting outwardly beyond respective ends of the blade and extending into the corersponding channels;
   a seal for each channel respectively, each seal being disposed in its respective channel and including a flap projecting outwardly from the channel and toward the other of said members;
   a cylindrical bearing for each of said frame members, and a transversely polygonal shaft received in each tubular hub and projecting outwardly therefrom, each shaft being rotatably received in a corresponding bearing for pivotally mounting the vane in said frame and accommodating movement of the vane to and from a blocking position across the frame opening,
   said flap being configured to sealingly embrace the hubs and said blade when the vane is in said blocking position.

2. The invention of claim 1, wherein is included means rigidly securing the shaft in its corresponding hub whereby the shaft rotates with the blade.

3. The invention of claim 2, wherein each of said shafts is transversely hexagonal.

4. The invention of claim 1, wherein said blade is provided with an integral, continuous tube extending along the longituidnal axis of the blade and projecting outwardly from opposite ends thereof to present said hubs, said tube having a slot extending its entire length, said shafts being receieved in the tube, the tube having a longitudinally extending slot disposed to admit tools for shifting said shafts within the tube.

5. A damper comprising:
   a rigid, rectangular frame including a pair of spaced apart side members, each member having a longitudinally extending channel communicating with the inner surface thereof;
   a vane for said damper, said vane including a generally flat blade and a pair of hubs projecting outwardly beyond respective ends of the blade;
   a seal for each channel respectively, each seal being disposed in its respective channel and including a base and a generally V-shaped projection, each projection including a first leg integral at one end with the base and a second leg integral with the other end of said first leg and projecting generally back toward the base at an acute angle from the first leg; and
   means mounting said hubs to said members for pivoting movement of the vane to and from a blocking position across the frame opening,
   said hubs extending into the corresponding channels, and
   said blade being positioned with respect to said channels to effect engagement of said second leg by said blade whereby when the latter is moved to said blocking position, said seals embrace the hubs and said blade.

References Cited

UNITED STATES PATENTS

| | | | |
|---|---|---|---|
| 3,047,914 | 8/1962 | Kahn et al. | 49—91X |
| 3,084,715 | 4/1963 | Scharres | 137—601 |
| 3,156,446 | 11/1964 | Chaloka | 137—601X |
| 3,204,548 | 9/1965 | McCabe | 98—110X |
| 3,484,990 | 12/1969 | Kahn et al. | 49—91 |

ROBERT G. NILSON, Primary Examiner

U.S. Cl. X.R.

137—601; 251—308